(12) United States Patent
Miyazaki

(10) Patent No.: US 9,197,585 B2
(45) Date of Patent: Nov. 24, 2015

(54) APPARATUS AND METHOD FOR RELAYING A PACKET TRANSMITTED FROM AND TO AN INFORMATION PROCESSOR

(71) Applicant: FUJITSU LIMITED, Kawasaki-shi, Kanagawa (JP)

(72) Inventor: Keiji Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 13/754,369

(22) Filed: Jan. 30, 2013

(65) Prior Publication Data

US 2013/0243005 A1  Sep. 19, 2013

(30) Foreign Application Priority Data

Mar. 16, 2012  (JP) ................. 2012-061204

(51) Int. Cl.
*H04L 12/937* (2013.01)
(52) U.S. Cl.
CPC .................... *H04L 49/253* (2013.01)
(58) Field of Classification Search
None
See application file for complete search history.

(56) References Cited

U.S. PATENT DOCUMENTS

2008/0130650 A1* 6/2008 Nishimura ............... 370/394
2009/0323687 A1 12/2009 Nishimura
2010/0316053 A1* 12/2010 Miyoshi et al. .......... 370/392
2012/0182866 A1* 7/2012 Vinayagam et al. ...... 370/228
2013/0243005 A1* 9/2013 Miyazaki .................. 370/401

FOREIGN PATENT DOCUMENTS

JP    2008-141614     6/2008
JP    2010114724      5/2010
WO   WO 2008/111173 A1   9/2008

OTHER PUBLICATIONS

Japanese Patent Office Action issued Jul. 21, 2015 in corresponding Japanese Patent Application No. 2012-061204.

* cited by examiner

*Primary Examiner* — Ajay Cattungal
(74) *Attorney, Agent, or Firm* — Staas & Halsey LLP

(57) ABSTRACT

An apparatus relays a packet transmitted from and to an information processor via plurality of ports. The apparatus stores, in a memory, first information identifying the information processor in association with a port from which the packet is to be transmitted. When a first packet is received via a first port, the apparatus determines whether second information contained in the first packet and identifying a transmission destination of the first packet is stored in the memory. When the second information is stored in the memory, the apparatus transmits the first packet from a second port associated with the second information, and otherwise transmits the first packet from third ports that are sequentially selected, from among the plurality of ports other than the first port, in variable order that is dynamically determined based on a current traffic state of the plurality of ports.

10 Claims, 12 Drawing Sheets

FIG. 3

| PORT NUMBER | MAC ADDRESS |
|---|---|
| 1 | 00:00:C0:11:11:11 |
| 2 | 00:00:C0:22:22:22 |
| ⋮ | ⋮ |

| PORT NUMBER | TRANSMITTED PACKET RATE | MAC LEARNING COUNT | DETECTED CONGESTION COUNT | DISCARDED PACKET COUNT | INCREASED TRANSMITTED PACKET COUNT |
|---|---|---|---|---|---|
| 1 | 200 Mbps | 10 | 0 | 0 | −50 Mbps |
| 2 | 900 Mbps | 50 | 5 | 1000 | +100 Mbps |
| 3 | 800 Mbps | 40 | 8 | 2000 | −100 Mbps |
| ⋮ | ⋮ | ⋮ | ⋮ | ⋮ | ⋮ |

| TRANSMITTING SOURCE INFORMATION | RECEPTION PORT INFORMATION | RECEPTION TIME | FCS |
|---|---|---|---|
| 00:00:C0:22:22:22 | 2 | 1:25:13:25:21.215 | xxxxxxxx |
| ⋮ | ⋮ | ⋮ | ⋮ |

APPARATUS AND METHOD FOR RELAYING A PACKET TRANSMITTED FROM AND TO AN INFORMATION PROCESSOR

CROSS-REFERENCE TO RELATED APPLICATION

This application is based upon and claims the benefit of priority of the prior Japanese Patent Application No. 2012-061204, filed on Mar. 16, 2012, the entire contents of which are incorporated herein by reference.

FIELD

The embodiments discussed herein are related to apparatus and method for relaying a packet transmitted from and to an information processor.

BACKGROUND

A conventional known relay device registers, in a forwarding database (FDB), the media access control (MAC) address of a transmission source from which a packet has been transmitted in association with a port via which the packet has been received, and selects, based on the FDB, a port from which the packet is to be transmitted.

For example, upon receiving a packet, the relay device registers, in the FDB, the MAC address of the transmission source of the packet in association with a port via which the packet has been received. The relay device also determines whether the MAC address of the transmission destination of the received packet is registered in the FDB. When the MAC address of the transmission destination is registered in the FDB, the relay device transmits the packet via the port that has been registered in association with the MAC address.

When the MAC address of the transmission destination of the received packet is not registered in the FDB, the relay device performs flooding that causes the packet to be transmitted in a predetermined order from all ports other than the port via which the packet has been received. When the relay device receives, via a plurality of ports, packets flooded from other relay devices, the relay device registers, in the FDB, the MAC address of the transmission source of the received packet in association with a port via which one of the packets has been first received.

As an example of the relay device, a switch that transmits a packet using a FDB will be described below.

FIG. 11 is a diagram illustrating an example of a system in which conventional switches are used. In the example in FIG. 11, packets that are transmitted and received between servers 38, 38a, 38b, and servers 38c, 38d, 38e, are relayed via a plurality of switches 30 to 37.

When the switches 30 to 37 each receive a packet destined for a MAC address that is not registered in the FDB, the switch performs flooding. The switches 30 to 37 each learn a path that causes the least delay by registering, in the FDB, a port via which one of packets flooded from another relay device has been first received in association with the MAC address of the transmission source of the received packet.

FIG. 12 is a schematic diagram illustrating an example of flooding processing executed by a conventional switch. In the example in FIG. 12, the switch 30 includes a plurality of ports 39 to 42 and a MAC processing unit 43. For example, the MAC processing unit 43 receives a packet from the server 38 via the port 39.

Then, the MAC processing unit 43 determines whether the MAC address of the transmission destination of the received packet is registered in the FDB. When the MAC processing unit 43 determines that the MAC address is not registered, the MAC processing unit 43 performs flooding. That is, the switch 30 transmits the packet from the ports 40, 41, and 42, in a predetermined order, for example, in order of the port 40, port 41, and port 42.

Then, in the example in FIG. 11, the switches 31 to 36 each flood the packet transmitted from the switch 30 and register, in the FDB, information on the server 38 in association with a port via which the packet has been first received. As a result, the switches 30 to 37 each learn a path that causes the least delay among the paths through which packets destined for the server 38 are transferred.

After that, upon receiving a packet destined for the server 38, each of the switches 30 to 37 transmits the packet via the port associated with the MAC address of the server 38. That is, the switches 30 to 37 each transfer the packet destined for the server 38 through the path that causes the least delay.

Japanese Laid-open Patent Publication No. 2008-141614 is an example of related art.

SUMMARY

According to an aspect of the invention, an apparatus relays a packet transmitted from and to an information processor. The apparatus including a plurality of ports each configured to transmit and receive the packet, and a memory configured to store first identification information identifying the information processor in association with a port from which the packet is to be transmitted to the information processor. The apparatus determines, when a first packet is received via a first port in the plurality of ports, whether second identification information that is contained in the first packet and identifies a transmission destination of the first packet is stored in the memory or not. The apparatus transmits, when it is determined that the second identification information is stored in the memory, the first packet from a second port associated with the second identification information. Further, the apparatus transmits, when it is determined that the second identification information is not stored in the memory, the first packet from third ports that are sequentially selected, from among the plurality of ports other than the first port, in variable order that is dynamically determined based on a current traffic state of the plurality of ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a forwarding database (FDB), according to a first embodiment;

FIG. 4 is a diagram illustrating an example of statistical information, according to a first embodiment;

FIG. 5 is a diagram illustrating an example of a first-arrival learning table, according to a first embodiment;

DESCRIPTION OF EMBODIMENTS

In the technology in which flooding is performed in a predetermined fixed order, however, each time each switch receives a packet destined for a MAC address that is not registered in the FDB, the switch transmits the packet from all ports in the predetermined fixed order. This is problematic in that although there are a plurality of paths that cause transfer almost the same delay, priorities for transferring packets are biased toward particular paths.

Figure 11:
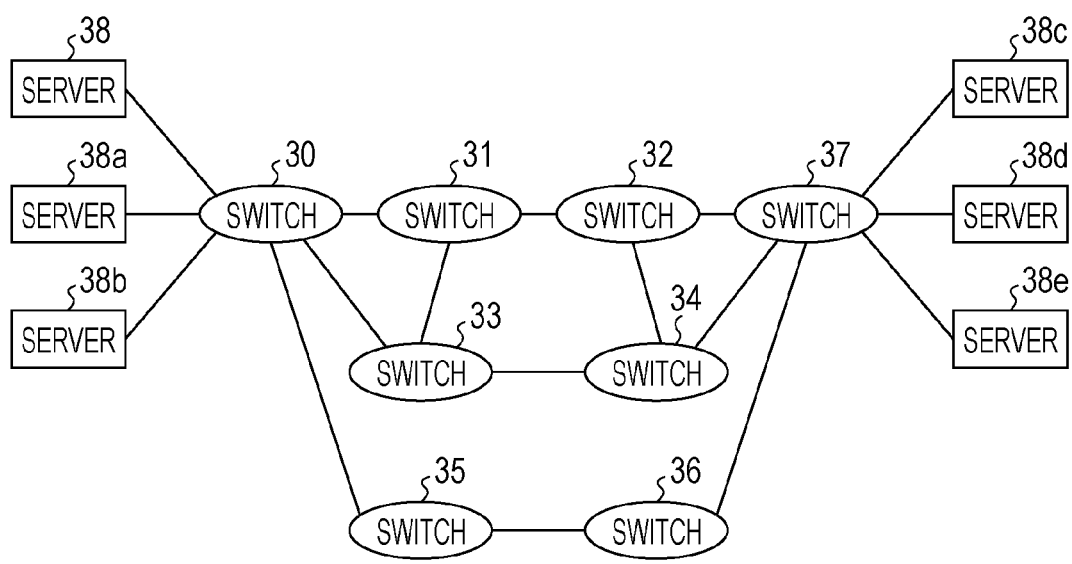
FIG. 11 is a diagram illustrating an example of a system in which conventional switches are used.
Figure 12:
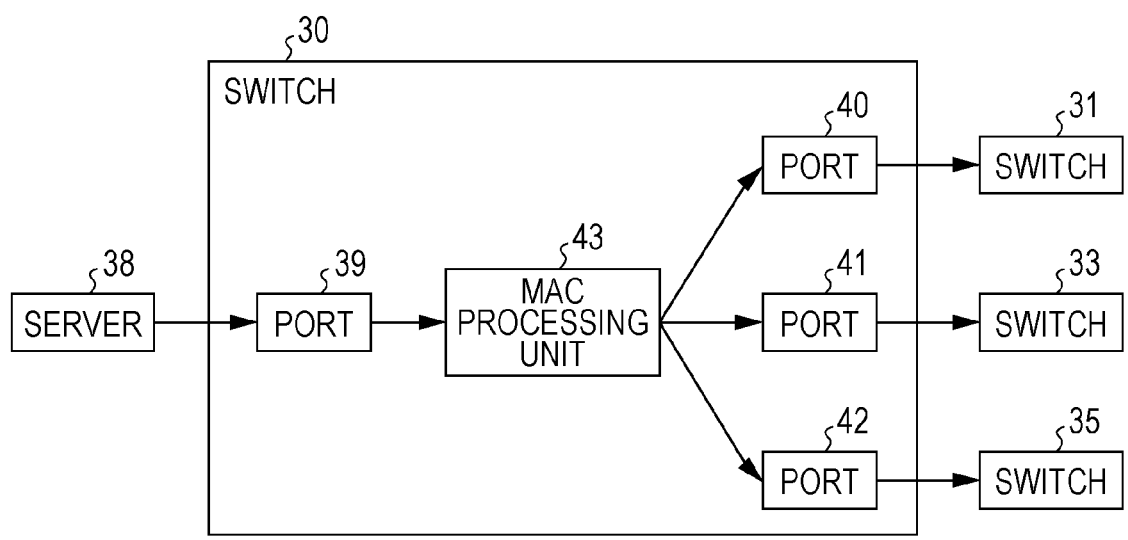
FIG. 12 is a schematic diagram illustrating an example of flooding processing executed by a conventional switch.

In the example in FIG. 11, for example, there are three paths having the same hop count between the switch 30 and the switch 37. That is, there are three paths between the switch 30 and the switch 37a: a path passing through the switch 31 and switch 32, a path passing through the switch 33 and switch 34, and a path passing through the switch 35 and switch 36. A delay caused during packet transmission or reception between each two switches is almost the same.

Each time the switch 30 receives a packet destined for a MAC address that is not registered in the FDB via the port 39, the switch 30 transmits a packet from the port 40, port 41, and port 42 in that order. Then, the switch 31 receives the packet before the switch 33 and switch 35 receives the packet, after which the switch 31 transmits the received packet to the switch 32. The switch 32 transmits the packet to the switch 37 before the switch 34 and switch 36 transmits the packet.

As a result, although there are a plurality of paths that cause almost the same transfer delay, the switch 37 first receives the packet that has passed through the switch 31 and switch 32. Accordingly, although there are a plurality of paths that cause almost the same delays, each time a packet destined for a MAC address that is not registered in the FDB is transferred, the switches 30 to 37 learn a path passing through the switch 32 and switch 31.

Therefore, it is desirable to reduce the unbalanced use of paths through which packets are transferred.

A relay device, an information processing system and a relay method according to this application will be described with reference to the attached drawings.

First Embodiment

Figure 1:
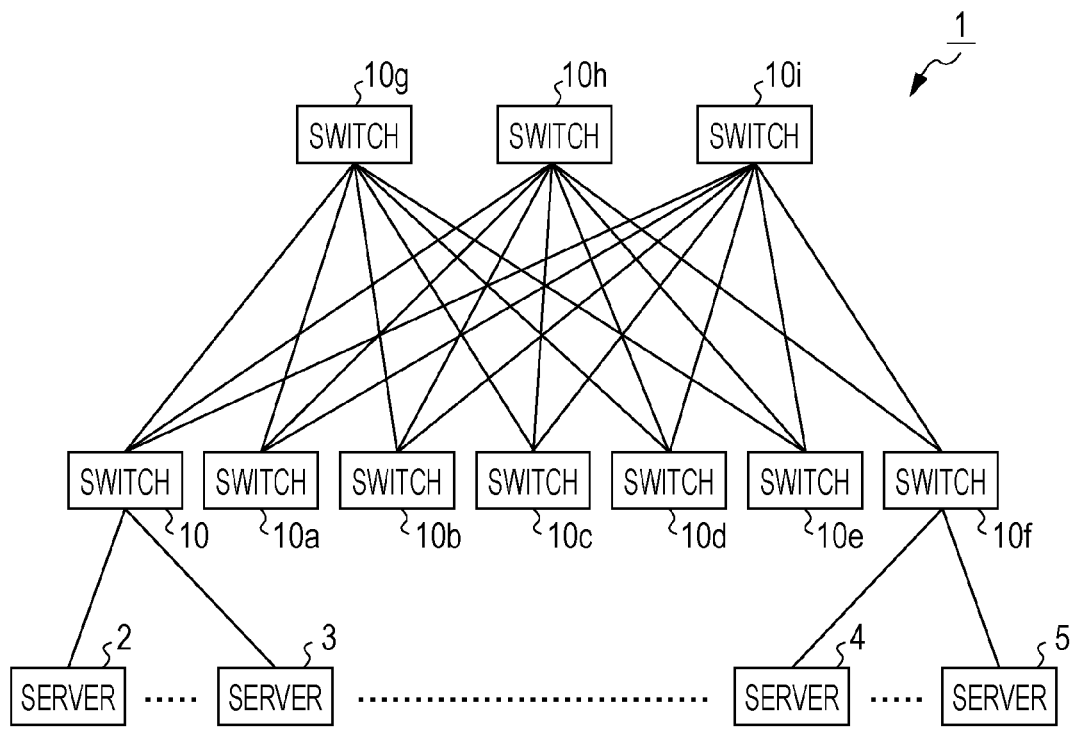
FIG. 1 is a diagram illustrating an example of an information processing system, according to a first embodiment.

FIG. 1 is a diagram illustrating an example of an information processing system, according to a first embodiment. FIG. 1 illustrates an information processing system in which a plurality of switches are connected with each other in a multilevel structure so that the switches relay packets that are transferred among a plurality of servers. The information processing system may be installed, for example, in a data center.

As illustrated in FIG. 1, the information processing apparatus 1 includes a plurality of servers 2 to 5 and a plurality of switches 10 to 10i. Although in the example in FIG. 1, servers other than the servers 2 to 5 are not illustrated, the information processing system 1 may include any number of servers.

The switches 10 to 10f in the example in FIG. 1 are connected to the servers 2 to 5. The switches 10g to 10i are high-order switches connected to the switches 10 to 10f, respectively, and relay packets transmitted and received by the switches 10 to 10f. That is, in the example in FIG. 1, the information processing system 1 is a system in which the plurality of switches 10 to 10i are connected with each other so as to have a two-stage fat-tree structure and relay packets transmitted and received by the servers 2 to 5.

The server 2 is an information processing apparatus that transmits and receives packets to and from the other servers 3 to 5. The server 2 is assigned an identifier that uniquely identifies the server 2; when transmitting and receiving a packet, the server 2 uses the identifier.

For example, the server 2 has a network interface card (NIC) to transmit and receive packets to and from the other servers 3 to 5. The NIC is assigned a media access control (MAC) address that uniquely identifies the NIC. When transmitting a packet, the server 2 stores the MAC address of the NIC included in the server 2 in the packet as a transmission source address and also stores the MAC address of a NIC included in a server to which the packet is transmitted in the packet as a transmission destination address. The server 2 then stores data to be transmitted in the packet and transmits the packet to the switch 10. The servers 3 to 5 are assumed to have functions similar to the functions of the server 2, and descriptions thereof will be omitted here.

Next, processing executed by the switch 10 included in the information processing system 1 will be described with reference to FIG. 2. The description below will focus on the processing executed by the switch 10. Processing executed by the switches 10a to 10i will be omitted here, assuming that the switches 10a to 10i have functions similar to the functions of the switch 10.

Figure 2:
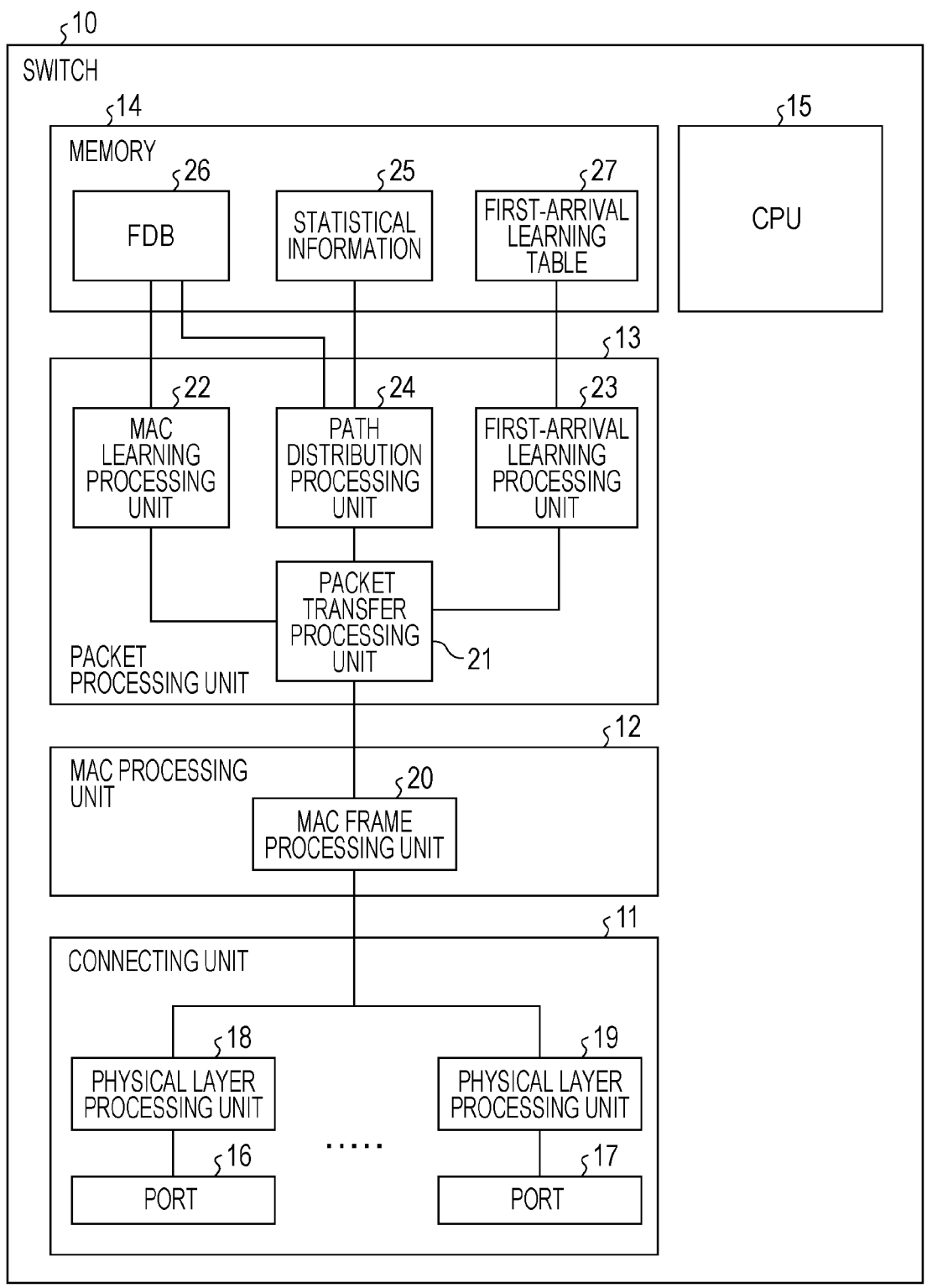
FIG. 2 is a diagram illustrating a functional structure of a switch, according to a first embodiment.

FIG. 2 is a diagram illustrating a functional structure of a switch, according to a first embodiment. As illustrated in the example of FIG. 2, a switch 10 may be configured to include a connecting unit 11, a MAC processing unit 12, a packet processing unit 13, a memory 14, and a central processing unit (CPU) 15. The connecting unit 11 includes a plurality of ports 16 and 17 and a plurality of physical layer processing units 18 and 19.

The MAC processing unit 12 includes a MAC frame processing unit 20. The packet processing unit 13 includes a packet transfer processing unit 21, a MAC learning processing unit 22, a first-arrival learning processing unit 23, and a path distribution processing unit 24. The memory 14 stores a forwarding database (FDB) 26, statistical information 25, and a first-arrival learning table 27.

First, the FDB 26, statistical information 25, and first-arrival learning table 27 stored in the memory 14 will be described with reference to FIGS. 3 to 5. FIG. 3 is a diagram illustrating an example of a forwarding database (FDB), according to a first embodiment. In the example in FIG. 3, a FDB 26 includes a plurality of entries in each of which a port number and a MAC address are associated with each other.

The port number is information that identifies the port 16 or 17 included in the switch 10. For example, the port number 1 identifies the port 16 and the port number 2 identifies the port 17. The MAC address indicates a MAC address assigned to a NIC provided for one of servers. The FDB 26 stores entries in each of which a MAC address identifying the transmission source of a packet received by the switch 10 and a port number identifying a port via which the packet including the MAC address as the transmission source was first received are associated with each other.

For example, when the switch 10 receives a packet transmitted from the server 2 at the port 16, the switch 10 stores, in the FDB 26, a MAC address assigned to the NIC of the server 2 and a port number identifying the port 16 in association with each other. When the switch 10 receives a packet transmitted from the server 3 via the port 17, the switch 10 stores, in the FDB 26, a MAC address assigned to the NIC of the server 3 and a port number identifying the port 17 in association with each other.

In a detailed example, the FDB 26 stores an entry in which the port number 1 identifying the port 16 and a MAC address of 00:00:C0:11:11:11 assigned to the NIC of the server 2 are associated with each other. The FDB 26 also stores an entry in which the port number 2 identifying the port 17 and a MAC address of 00:00:C0:22:22:22 assigned to the NIC of the server 3 are associated with each other.

Next, the statistical information 25 will be described with reference to FIG. 4.

FIG. 4 is a diagram illustrating an example of statistical information, according to a first embodiment. In the example of FIG. 4, statistical information 25 includes entries in each of which a port number, a transmitted packet rate, a MAC learning count, a congestion detection count, a discarded packet count, and an increased transmitted packet count are associated with each other.

The transmitted packet rate indicates the amount of data that are transmitted in a unit time from the port identified by the associated port number. For example, at intervals of a predetermined time, the switch 10 counts the number of packets that have been transmitted from each of the ports 16 and 17, multiplies the counted number by the number of bits in the packet, divides the multiplication result by the predetermined time, and stores the division result in the statistical information 25 as the transmitted packet rate.

In the example in FIG. 4, for example, the statistical information 25 indicates that the port with the port number 1 transmits packets at 200 megabits per seconds (Mbps), the port with the port number 2 transmits packets at 900 Mbps, and the port with the port number 3 transmits packets at 800 Mbps.

The MAC leaning count indicates the number of MAC addresses stored in the FDB 26 in association with each port number. In the example in FIG. 4, for example, the statistical information 25 indicates that 10 MAC addresses are stored in the FDB 26 in association with the port number 1. The statistical information 25 also indicates that 50 MAC addresses are stored in the FDB 26 in association with to the port number 2. The statistical information 25 also indicates that 40 MAC addresses are stored in the FDB 26 in association with the port number 3.

The congestion detection count indicates the number of times congestion has occurred at a port identified by each port number. Congestion will be described below. For example, the ports 16 and 17 each have a buffer to temporarily store packets to be transmitted. The switch 10 counts the number of packets stored in the buffer in each of the ports 16 and 17. When the counted number of packets is larger than a predetermined value, the switch 10 determines congestion has occurred.

For example, the statistical information 25 indicates that there has no congestion at the port with the port number 1. The statistical information 25 also indicates that congestion has occurred five times at the port with the port number 2. The statistical information 25 also indicates that congestion has occurred eight times at the port with the port number 3.

The discarded packet count indicates the number of packets that have been flooded by each of the other switches 10a to 10i and have been discarded by each port. That is, the switch 10 receives packets flooded by the other switches 10a to 10i through the ports 16 and 17. In this case, the switch 10 transfers only a packet that has been first received by the switch 10 and discards packets that have been received later. The switch 10 counts the number of packets that the switch 10 has received but has discarded for each of the ports 16 and 17. The counted number is the discarded packet count in the statistical information 25.

In the example in FIG. 4, for example, the statistical information 25 indicates that packets received at the port with the port number 1 have not been discarded. The statistical information 25 also indicates that out of the packets received at the port with the port number 2, 1000 packets have been discarded. The statistical information 25 also indicates that out of the packets received at the port with the port number 3, 2000 packets have been discarded.

The increased transmitted packet count indicates an increase in the transmitted packet rate in a predetermined time for each port. That is, the switch 10 updates the transmitted packet rate of each port at intervals of the predetermined time and stores a difference between the previous transmitted packet rate and the current transmitted packet rate in the statistical information 25 as the increased transmitted packet count.

In the example in FIG. 4, for example, the statistical information 25 indicates that the packet rate at the port with the port number 1 has decreased by 50 Mbps from the previous packet rate. The statistical information 25 also indicates that the packet rate at the port with the port number 2 has increased by 100 Mbps from the previous packet rate. The statistical information 25 also indicates that the packet rate at the port with the port number 3 has decreased by 100 Mbps from the previous packet rate.

Next, the first-arrival learning table 27 will be described with reference to FIG. 5.

FIG. 5 is a diagram illustrating an example of a first-arrival learning table, according to a first embodiment. In the example in FIG. 5, the first-arrival learning table 27 includes entries in each of which transmission source information, reception port information, a reception time, and a frame check sequence (FCS) are associated with each other. The transmission source information is a MAC address indicating the transmission source of a packet flooded by one of the switches 10a to 10i other than the switch 10.

The reception port information is a port number identifying a port via which the flooded packet was first received. The reception time indicates a time of the day at which the flooded packet was first received; in the example in FIG. 5, the reception time is represented as month:day:hours:minutes:seconds. The FCS is a checksum assigned to each packet to detect an error when performing a frame relay, and is calculated from the received packet.

In the example in FIG. 5, for example, the first-arrival learning table 27 indicates that a packet including 00:00:C0:22:22:22 as the MAC address of the transmission source was received from a port with the port number 2 at 1:25:13:25:21.215. The first-arrival learning table 27 also indicates that the FCS of the received packet is xxxxxxxx.

Referring back to FIG. 2, the functional structure of the switch 10 will be described below. The ports 16 and 17 are used for transmitting and receiving packets to and from an external apparatus, and, in the case, connected to the servers 2 and 3, respectively. Although not illustrated in FIG. 2, the switch 10 has ports connected to the switches 10g, 10h, and 10i. The CPU 15 performs calculation processing that implements the functions of the switch 10 by executing a program.

The physical layer processing units 18 and 19 execute processing in a physical layer during packet transmission and reception. For example, the physical layer processing units 18 and 19 perform frame coding for packets, parallel-to-serial conversion, and signal waveform conversion. For example, the physical layer processing units 18 and 19 convert an electric signal received via the port 16 to a packet at a data link layer level and output the converted packet to the MAC frame processing unit 20. Further, upon receiving a packet from the MAC frame processing unit 20, the physical layer processing units 18 and 19 convert the received packet to an electric signal and output the converted electric signal from the ports 16 to 17, respectively.

The physical layer processing units 18 and 19 each have a buffer in which packets to be respectively transmitted from the ports 16 and 17 are temporarily stored. The physical layer processing units 18 and 19 count, at intervals of a predetermined time, the number of packets that have been stored in the buffer, and determine whether the counted number of packets is larger than a predetermined threshold. When the counted number of packets is larger than the predetermined threshold, the physical layer processing units 18 and 19 notify the MAC frame processing unit 20 that congestion has occurred. The physical layer processing units 18 and 19 also count the number of packets that have been transmitted from each of the ports 16 and 17, and notify the MAC frame processing unit 20 of the counted number of packets.

The MAC frame processing unit 20 performs, for example, analysis processing on MAC frames and protocol analysis processing on IP packets. For example, the MAC frame processing unit 20 receives a packet from the physical layer processing unit 18 or 19, analyzes the received packet, and extracts information described below.

That is, the MAC frame processing unit 20 extracts the MAC address of the transmission source of the packet, the MAC address of the transmission destination of the packet, a time of day at which the packet was received, and the port number of a port via which the packet was received. The MAC frame processing unit 20 also calculates an FCS from data stored in the packet. The MAC frame processing unit 20 outputs the extracted information items and the FCS to the packet transfer processing unit 21.

The MAC frame processing unit 20 receives, from the packet transfer processing unit 21, a notification indicating a port from which the received packet is to be transmitted. The MAC frame processing unit 20 then outputs the received packet to the physical layer processing unit corresponding to the port indicated by the notification. When notified by the packet transfer processing unit 21 that the packet is to be discarded, the MAC frame processing unit 20 discards the received packet.

The MAC frame processing unit 20 also receives a notification indicating that a packet is to be flooded and an order list indicating order of the ports 16 and 17 from which the packet is to be transmitted. The MAC frame processing unit 20 then outputs the same packet to the physical layer processing unit 18 in the port 16 and to the physical layer processing unit 19 in the port 17, in order indicated in the received order list.

When receiving, from the physical layer processing units 18 and 19, a notification indicating that congestion has occurred, the MAC frame processing unit 20 forwards the notification to the packet transfer processing unit 21. When receiving, from the physical layer processing units 18 and 19, a notification indicating the number of packets that have been transmitted from each of the ports 16 and 17, the MAC frame processing unit 20 forwards the notification to the packet transfer processing unit 21.

When acquiring, from the MAC frame processing unit 20, information about the packet received by the ports 16 and 17, the packet transfer processing unit 21 determines a port from which the received packet is to be transmitted according to the acquired information about the received packet. The packet transfer processing unit 21 then notifies the MAC frame processing unit 20 of the determined port.

For example, the packet transfer processing unit 21 receives, from the MAC frame processing unit 20, the MAC address of the transmission source of the packet, the MAC address of the transmission destination of the packet, the time of day at which the packet was received, the port number of the port via which the packet was received, and the FCS calculated from the data stored in the packet. The packet transfer processing unit 21 notifies the first-arrival learning processing unit 23 of the MAC address of the transmission source of the packet, the port number of the port via which the packet was received, the FCS, and the time of day at which the packet was received.

Thereafter, the packet transfer processing unit 21 is notified by the first-arrival learning processing unit 23 whether the packet is to be discarded or the packet is to be transferred. When notified by the first-arrival learning processing unit 23 that the packet is to be discarded, the packet transfer processing unit 21 notifies the MAC frame processing unit 20 that the packet is to be discarded. After discarding the packet, the packet transfer processing unit 21 notifies the path distribution processing unit 24 that the packet has been discarded.

When notified by the first-arrival learning processing unit 23 that the packet is to be transferred, the packet transfer processing unit 21 notifies the MAC learning processing unit 22 of the MAC address of the transmission source of the packet, the MAC address of the transmission destination of the packet, and the port number of the port via which the packet was received. The packet transfer processing unit 21 then receives, from the MAC learning processing unit 22, a notification of the port number of the port from which the packet is to be transmitted or a notification indicating that the port from which the packet is to be transmitted is not registered.

Upon receipt of the notification of the port number of the port from which the packet is to be transmitted, the packet transfer processing unit 21 notifies the MAC frame processing unit 20 of the port number reported by the MAC learning processing unit 22. Upon receipt of the notification indicating that the port from which the packet is to be transmitted is not registered, the packet transfer processing unit 21 requests the path distribution processing unit 24 to create an order list.

When requested to create an order list, the path distribution processing unit 24 creates an order list using a predetermined method and outputs the created list to the packet transfer processing unit 21. The packet transfer processing unit 21 then outputs, to the MAC frame processing unit 20, the order list and a notification indicating that the packet is to be flooded.

Upon receipt of the notification indicating that congestion has occurred, the packet transfer processing unit 21 notifies the path distribution processing unit 24 that congestion has occurred. Upon receipt of the number of packets that have been transmitted from each of the ports 16 and 17, the packet transfer processing unit 21 notifies the path distribution processing unit 24 of the number of packets that have been transmitted by each of the ports 16 and 17.

The MAC learning processing unit 22 receives, from the packet transfer processing unit 21, the MAC address of the transmission source of the packet, the MAC address of the transmission destination of the packet, and the port number of the port via which the packet was received. The MAC learning processing unit 22 then determines whether the MAC address of the transmission destination of the received packet is registered in the FDB 26.

When the MAC address of the transmission destination of the received packet is registered in the FDB 26, the MAC learning processing unit 22 acquires the port number associated with the MAC address of the transmission destination of the received packet. The MAC learning processing unit 22 then notifies the packet transfer processing unit 21 of the acquired port number. When the MAC address of the transmission destination of the received packet is not registered in the FDB 26, the MAC learning processing unit 22 notifies the packet transfer processing unit 21 that the port from which the packet is to be transmitted is not registered in the FDB 26.

The MAC learning processing unit 22 also determines, based on the MAC address and the port number having been received from the packet transfer processing unit 21, whether an entry in which the MAC address of the transmission source of the packet and the port number of the port via which the packet was received are associated with each other is registered in the FDB 26. When an entry in which the MAC address of the transmission source of the packet and the port number of the port via which the packet was received are associated with each other is registered in the FDB 26, the MAC learning processing unit 22 terminates processing without proceeding to next processing.

Meanwhile, when an entry in which the MAC address of the transmission source of the packet and the port number of the port via which the packet was received are associated with each other is not registered in the FDB 26, the MAC learning processing unit 22 registers an entry in which the MAC address of the transmission source of the packet and the port number of the port via which the packet was received are associated with each other in the FDB 26.

The first-arrival learning processing unit 23 receives, from the packet transfer processing unit 21, the MAC address of the transmission source of the packet, the port number of the port via which the packet was received, the time of day at which the packet was received, and the FCS. The first-arrival learning processing unit 23 then determines whether an entry in which the MAC address of the transmission source of the received packet and the FCS are associated with each other is registered in the first-arrival learning table 27.

When an entry in which the MAC address of the transmission source of the received packet and the FCS are associated with each other is registered in the first-arrival learning table 27, the first-arrival learning processing unit 23 determines whether the reception time stored in the entry registered in the first-arrival learning table 27 is before the time of date at which the packet was received and which has been received from the packet transfer processing unit 21. The first-arrival learning processing unit 23 also determines whether the reception port number stored in the entry differs from the port number reported by the packet transfer processing unit 21.

When the reception port number stored in the entry differs from the port number reported by the packet transfer processing unit 21 and the reception time stored in the entry is before the time of date at which the packet was received and which has been received from the packet transfer processing unit 21, the first-arrival learning processing unit 23 determines that a packet flooded from one of the other switches 10a to 10i was first received via another port and notifies the packet transfer processing unit 21 that the packet is to be discarded.

Meanwhile, when the reception port number stored in the entry is the same as the port number reported by the packet transfer processing unit 21 or the reception time stored in the entry is after the time of date at which the packet was received and which has been received from the packet transfer processing unit 21, the first-arrival learning processing unit 23 notifies the packet transfer processing unit 21 that the packet is to be transferred.

Further, when the reception port number stored in the entry differs from the port number reported by the packet transfer processing unit 21 and the reception time stored in the entry is after the time of date at which the packet was received and which has been received from the packet transfer processing unit 21, the first-arrival learning processing unit 23 deletes the registered entry and registers a new entry in the first-arrival learning table 27 by using information items received from the packet transfer processing unit 21.

When requested by the packet transfer processing unit 21 to create an order list, the path distribution processing unit 24 creates an order list using a method specified in advance and outputs the created order list to the packet transfer processing unit 21. For example, the path distribution processing unit 24 has functions that create an order list as described below.

That is, the path distribution processing unit 24 has a function that creates an order list in which port numbers are listed in ascending order of MAC learning counts stored in the statistical information 25. The path distribution processing unit 24 also has a function that creates an order list in which port numbers are listed in ascending order of transmitted packet rates stored in the statistical information 25.

The path distribution processing unit 24 also has a function that creates an order list in which port numbers are listed in ascending order of congestion detection counts stored in the statistical information 25. The path distribution processing unit 24 also has a function that creates an order list in which port numbers are listed in ascending order of increased transmitted packet rate stored in the statistical information 25. The path distribution processing unit 24 also has a function that creates an order list in which port numbers are listed in ascending order of discarded packet counts stored in the statistical information 25.

The path distribution processing unit 24 creates an order list by using any one of the methods described above and outputs the crated order list to the packet transfer processing unit 21. The user of the information processing system 1 may set a method to be used by the path distribution processing unit 24 at any timing. Alternatively, the path distribution processing unit 24 may select a method at random each time the path distribution processing unit 24 is requested to create an order list.

Upon receipt of the notification indicating that congestion has occurred, the path distribution processing unit 24 increments the congestion detection count, included in the relevant entry in the statistical information 25, by one. Upon receipt of the notification indicating the number of packets that have been transmitted from each of the ports 16 and 17, the path distribution processing unit 24 calculates the transmitted packet rate by multiplying the number of packets that have been transmitted from each of the ports 16 and 17 by the amount of information for one packet.

Further, for each port, the path distribution processing unit 24 subtracts the newly calculated transmitted packet rate from the transmitted packet rate stored in the statistical information 25 and sets the subtraction result as the increased transmitted packet count. The path distribution processing unit 24 then stores, in the statistical information 25, the calculated transmitted packet rate and the increased transmitted packet count.

The path distribution processing unit 24 also checks each entry in the FDB 26 at intervals of a predetermined time and counts the number of port numbers that are registered in the FDB 26 and have the same value identifying each port. The path distribution processing unit 24 then stores the counted number in the statistical information 25 as the MAC learning count for the each port.

As described above, the packet processing unit 13 registers, in the FDB 26, the MAC address of the transmission source of the received packet and the port number of the port via which the packet was received in association with each other.

The packet processing unit 13 also determines whether the MAC address of the transmission destination of the received packet is registered in the FDB 26.

When the MAC address of the transmission destination of the received packet is registered in the FDB 26, the packet processing unit 13 transmits the packet from a port having the port number stored in association with the registered MAC address. When the MAC address of the transmission destination of the received packet is not registered in the FDB 26, the packet processing unit 13 performs flooding in which the packet is transmitted from ports other than the port via which the packet was received. When performing flooding, the packet processing unit 13 transmits the packet without fixing order of ports from which the packet is transmitted.

The packet processing unit 13 uses a predetermined method selected from among the methods described below by which the packet is transmitted without fixing order of ports from which the packet is transmitted. That is, the packet processing unit 13 uses the transmitted packet rate stored in the statistical information 25 to indentify an ascending order of the number of packets that have been transmitted from each of the ports 16 and 17. The packet processing unit 13 then transmits the packet from ports other than the port via which the packet was received, in ascending order of the number of packets that have been transmitted from the ports other than the port via which the packet was received.

The packet processing unit 13 may also transmit the received packet from ports other than the port via which the packet was received, in ascending order of their MAC learning counts stored in the statistical information 25. The packet processing unit 13 may also transmit the received packet from ports other than the port via which the packet was received, in ascending order of their congestion detection counts stored in the statistical information 25.

The packet processing unit 13 may also transmit the received packet from ports other than the port via which the packet was received, in ascending order of their increased transmitted packet rates stored in the statistical information 25. The packet processing unit 13 may also transmit the received packet from ports other than the port via which the packet was received, in ascending order of their discarded packet counts stored in the statistical information 25.

Accordingly, when flooding a packet, the packet processing unit 13 may transmit the packet without fixing order of the ports 16 and 17 from which the packet is transmitted. As a result, when a plurality of paths having almost the same latency are available to transmit the packets, the switch 10 may solve the problem of the unbalanced use of paths through which packets are to be transferred.

Figure 6:
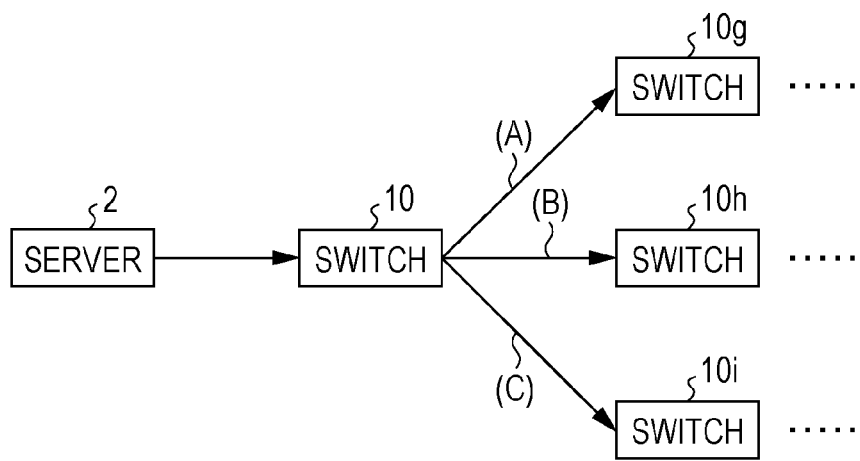
FIG. 6 is a diagram illustrating flooding processing executed by a switch, according to a first embodiment.

FIG. 6 is a diagram illustrating flooding processing executed by a switch, according to a first embodiment. In the example in FIG. 6, the switch 10 floods a packet that has been transmitted from the server 2 which is a transmission source.

For example, upon receipt of a packet from the server 2, the switch 10 determines whether the MAC address of the transmission destination of the packet is stored in the FDB 26. When the MAC address of the transmission destination is not stored in the FDB 26, the switch 10 executes flooding.

In this case, the switch 10 performs flooding without fixing order of ports from which the packet is to be transmitted. For example, the switch 10 transmits the packet through the path indicated by (A), the path indicated by (B), and the path indicated by (C) in FIG. 6 in that order. Then, the switch 10g, switch 10h, switch 10i receive the packet in that order and then execute flooding in that order.

When the MAC address of the transmission destination of a packet received again from the server 2 is not stored in the FDB 26, the switch 10 transmits the packet through the path indicated by (B), the path indicated by (A), and the path indicated by (C) in FIG. 6 in that order. Then, the switch 10h, switch 10g, switch 10i receive the packet in that order and then execute flooding in that order.

As described above, the switch 10 determines the order of ports from which a packet is to be transmitted each time the switch 10 performs flooding, without fixing an order of ports from which the packet is to be transmitted. The switch 10 then outputs the packet from the ports in the determined order. Therefore, the switch 10 may transfer the packet through different paths rather than through a particular path.

By contrast, when the conventional switch performs flooding, it transmits a packet from ports in predetermined order. Therefore, when there are a plurality of paths having almost the same latency, paths are used in an unbalanced manner to transmit the packet. However, the switch 10 does not fix the order of ports from which the packet is to be transmitted during the flooding of the packet. As a result, even when there are a plurality of paths having almost the same latency, the switch 10 may transfer the packet through different paths rather than through a particular path.

Figure 7:
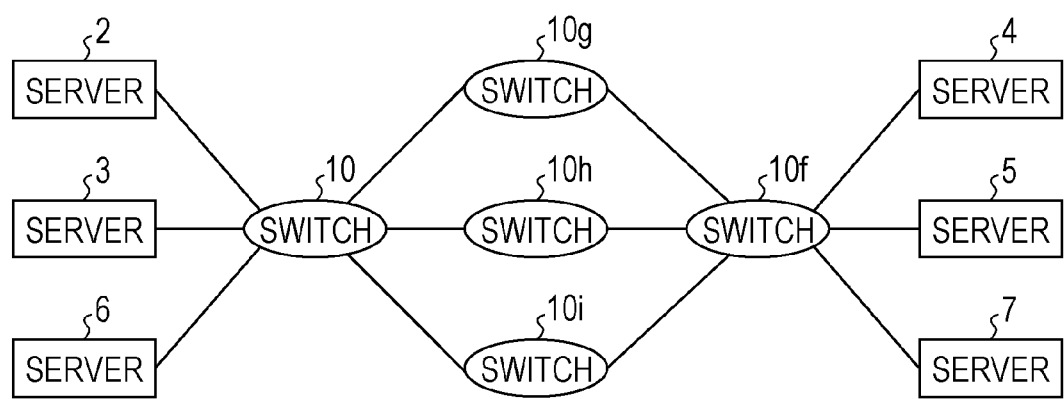
FIG. 7 is a diagram illustrating an example in which a packet is transferred via a plurality of paths, according to a first embodiment.

FIG. 7 is a diagram illustrating an example in which a packet is transferred via a plurality of paths, according to a first embodiment. In the example in FIG. 7, for example, the servers 2, 3, and 6 are connected to the switch 10, and the servers 4, 5, and 7 are connected to the switch 10f. The server 2 is assumed to transmit a packet destined for the server 4. The server 3 is assumed to transmit a packet destined for the server 5. The server 6 is assumed to transmit a packet destined for the server 7.

In the example in FIG. 7, there are a plurality of paths used to transfer a packet among the servers. When, for example, a packet is transmitted and received between the server 2 and the server 4, between the server 3 and the server 5, and between the server 6 and server 7, a path passing through the switch 10g, a path passing through the switch 10h, and a path passing through the switch 10i are available. All paths are assumed to have the same hop count and thereby to transfer a packet with almost the same delay.

When receiving a packet transmitted from the server 2, the switch 10 floods the received packet to the switches 10g to 10i. For example, the switch 10 floods the packet to the switch 10g, switch 10h, and switch 10i in that order. The switches 10g to 10i each register, in the FDB 26, a port connected to the switch 10 and the MAC address of the server 2 in association with each other, and flood the packet received from the switch 10. As a result, the switch 10f receives the packets flooded from the switches 10g to 10i.

In the case, the switch 10 first transmitted the packet to the switch 10g. Accordingly, the switch 10f first receives the packet from the switch 10g and thereby registers, in the FDB 26, the port connected to the switch 10g and the MAC address of the server 2 in association with each other. As a result, a packet destined for the server 2 is transferred through the path passing through the switch 10*f*, switch 10*g*, and switch 10.

Next, the switch 10 floods a packet received from the server 3. With the conventional switch, the packet is transmitted in the same order in which the packet received from the server 2 was flooded. Therefore, the same path is used to transfer a packet destined for the server 3 and to transfer a packet destined for the server 2.

However, when the server 10 receives the packet from the server 3, the switch 10 transmits the received packet to the switch 10*h*, switch 10*g*, and switch 10*i* in that order, for example. Then, the switch 10*f* first receives the packet from the switch 10*h*. As a result, a packet destined for the server 3 is transferred through the path passing through the switch 10*f*, the switch 10*h*, and the switch 10.

Next, the switch 10 floods a packet transmitted from the server 6 to the switch 10*i*, switch 10*h*, and switch 10*g* in that order. As a result, the switch 10*f* first receives the packet from the switch 10*i*. Therefore, a packet destined for the server 6 is transferred through the path passing through the switch 10*f*, switch 10*i*, and switch 10.

As described above, the switch 10 does not fix the order of ports from which a packet is to be transmitted during the flooding of the packet. Therefore, when there are a plurality of paths having almost the same delay in a network in a first-arrival learning method, paths through which packets are to be transferred may be dispersed over the plurality of paths. The switch 10 may determine the order in which packets are to be transmitted each time according to the number of packets that have been transmitted from each port.

That is, when many packets are transmitted from a port having a high transmitted packet rate, the switch 10 may flood a packet from different ports in ascending order of their transmitted packet rates, thereby suppressing the unbalanced use of paths. Many packets are transmitted from a port having a large MAC learning count. Accordingly, when a packet is flooded from different ports in ascending order of their MAC learning counts, the switch 10 may disperse paths through which packets are to be transferred, over a plurality of paths. Many packets are transmitted from a port having a large congestion detection count. Accordingly, when a packet is flooded from different ports in ascending order of their congestion detection counts, the switch 10 may suppress the unbalanced use of paths.

Many packets are transmitted from a port having an increased transmitted packet rate. Accordingly, when a packet is flooded from different ports in ascending order of their increased transmitted packet rates, the switch 10 may suppress the unbalanced use of paths. A port having a large discarded packet count has a large latency. Accordingly, when a packet is flooded from different ports in ascending order of their discarded packet counts, the switch 10 may transfer the packet through a path having a smaller latency.

In the embodiments, for example, the port 16, port 17, physical layer processing unit 18, physical layer processing unit 19, MAC frame processing unit 20, packet transfer processing unit 21, MAC learning processing unit 22, first-arrival learning processing unit 23, and path distribution processing unit 24 may be implemented using electronic circuits. Examples of these electric circuits include application-specific integrated circuits (ASICs), field programmable gate arrays (FPGAs), and other integrated circuits as well as central processing units (CPUs) and microprocessing units (MPUs).

The statistical information 25, FDB 26, and first-arrival learning table 27 are data stored in the memory 14. The memory 14 may be a semiconductor memory device, such as a random access memory (RAM) or a flash memory. Alternatively, the memory 14 may be a storage unit, such as a hard disc or optical disc.

Next, a flow of processing executed by the switch 10 will be described with reference to FIG. 8.

Figure 8:
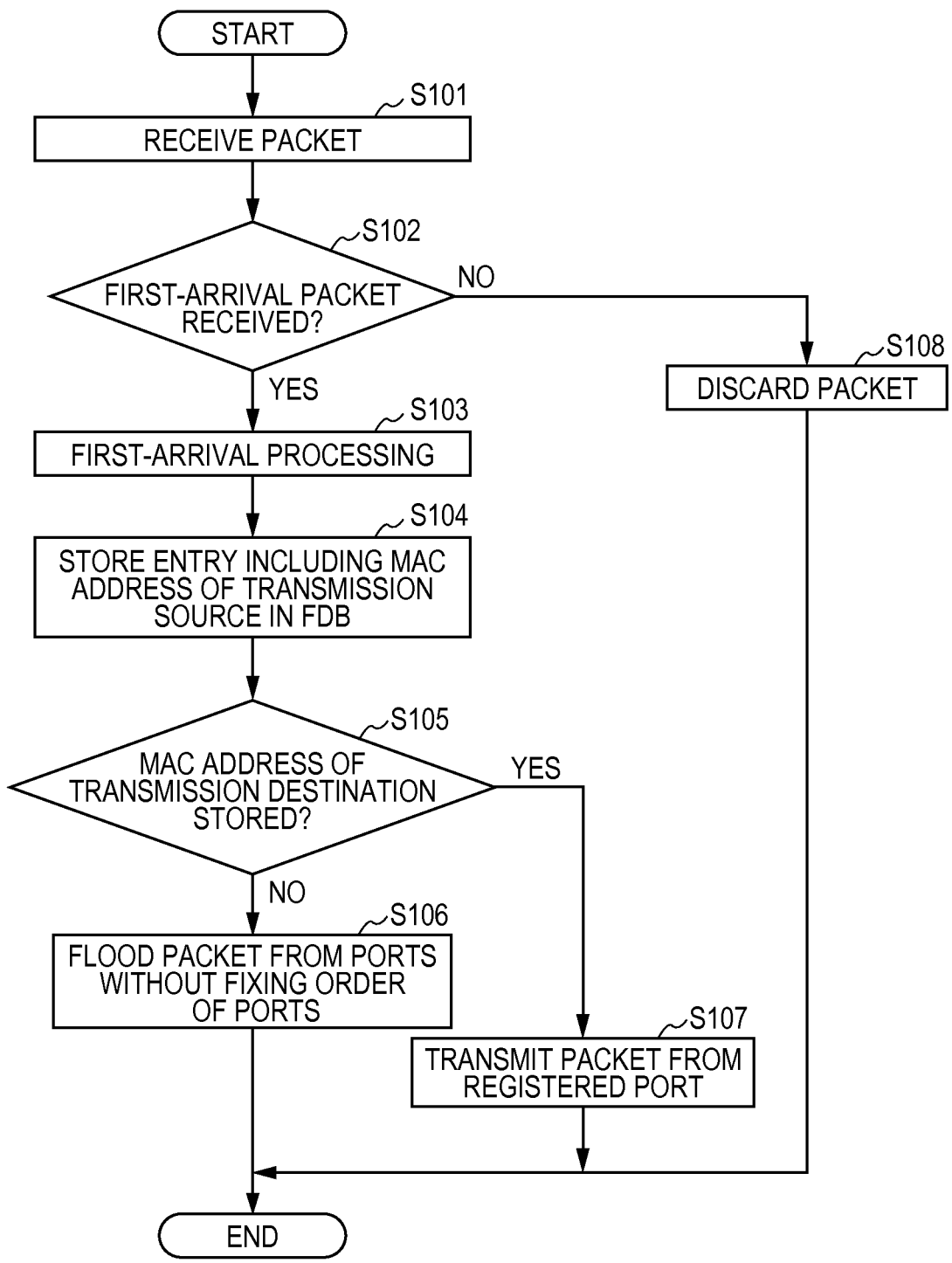
FIG. 8 is a diagram illustrating an example of an operational flowchart executed by a switch, according to a first embodiment.

FIG. 8 is a diagram illustrating an operational flowchart executed by a switch, according to a first embodiment.

In operation S101, the switch 10 receives a packet from one of ports. In operation S102, the switch 10 determines whether the received packet is a first-arrival packet. That is, the switch 10 determines whether the received packet is a packet that has been received first among packets flooded from another switch.

When the switch 10 determines that the received packet is a first-arrival packet (YES in operation S102), the switch 10 registers the first-arrival packet in the first-arrival learning table 27, as first-arrival processing (in operation S103).

In operation S104, the switch 10 stores an entry including the MAC address of the transmission source of the received packet in the FDB 26.

In operation S105, the switch 10 also determines whether the MAC address of the transmission destination of the received packet has been already stored in the FDB 26. When the switch 10 determines that the MAC address of the transmission destination has not been stored in the FDB 26 (NO in operation S105), the switch 10 floods the packet from ports other than the port via which the packet was received, without fixing order of ports from which the packet is to be transmitted (in operation S106), after which the switch 10 terminates the processing.

When the switch 10 determines that the MAC address of the transmission destination has been stored in the FDB 26 (YES in operation S105), the switch 10 transmits the received packet from the port that is registered in the FDB 26 in association with the MAC address of the transmission destination (in operation S107), after which the switch 10 terminates the processing.

Meanwhile, when the received packet is not a first-arrival packet (NO in operation S102), the switch 10 discards the packet (in operation S108), and then terminates the processing.

Advantageous Effects in the First Embodiment

As described above, the switch 10 registers, in the FDB 26, the MAC address of the transmission source of the received packet and the port number of the port via which the packet was received, in association with each other. The switch 10 also determines whether the MAC address of the transmission destination of the received packet is registered in the FDB 26. When the MAC address of the transmission destination of the received packet is not registered in the FDB 26, the switch 10 floods the packet without fixing the order of ports from which the packet is to be transmitted. That is, the switch 10 transmits the packet from ports that have been selected sequentially in non-fixed order from among ports other than the port via which the packet was received.

When the switch 10 receives a plurality of packets flooded from the other switches 10*a* to 10*i*, the switch 10 registers, in the FDB 26, the port via which a packet was first received and the MAC address of the transmission source of the received packet, in association with each other. This allows the switch 10 to select a packet transmission path having the smallest latency.

The switch 10 uses a predetermined method selected from among the methods described below by which the packet is transmitted without fixing the order of ports from which the packet is to be transmitted. That is, the switch 10 may use the transmitted packet rate stored in the statistical information 25 to indentify ascending order of the number of packets that have been transmitted from each of the ports 16 and 17. The switch 10 then transmits the packet from ports other than the port via which the packet was received, in ascending order of the transmitted packet rates of the ports, that is, in ascending order of the number of packets that have been transmitted from each of the ports. This allows the switch 10 to reduce the unbalanced use of paths.

The switch 10 also may transmit the received packet from ports other than the port via which the packet was received, in ascending order of the MAC learning counts stored in the statistical information 25, thereby reducing the unbalanced use of paths. Further, the switch 10 may count the number of congestion detection counts for each port, and transmits the received packet from ports other than the port via which the packet was received, in ascending order of the congestion detection counts, thereby reducing the unbalanced use of paths.

The switch 10 also may transmit the received packet from ports other than the port via which the packet was received, in ascending order of the increased transmitted packet counts stored in the statistical information 25, thereby reducing the unbalanced use of paths. The switch 10 also may transmit the received packet from ports other than the port via which the packet was received, in ascending order of the discarded packet counts stored in the statistical information 25, that is, in ascending order of latencies of the paths, thereby selecting a path with a small latency.

As described above, when flooding a packet, the switch 10 may transmit the packet without fixing the order of ports from which the packet is to be transmitted. Accordingly, when a plurality of paths having almost the same latency are available to transmit packets, the switch 10 may reduce the unbalanced use of paths through which packets are transferred.

Second Embodiment

Although an embodiment of the present disclosure has been described, the embodiment may be practiced in other various ways other than described above. Another embodiment included in the present disclosure will be described below as a second embodiment.

(1) Network of the Information Processing System 1

In the information processing system 1 described above, a plurality of switches 10 to 10i are connected in a two-dimensional fat-tree structure as illustrated in FIG. 1, and the switches 10 to 10f, which function as edges, are connected to the servers 2 to 5. However, the embodiment is not limited to this structure.

Figure 9:
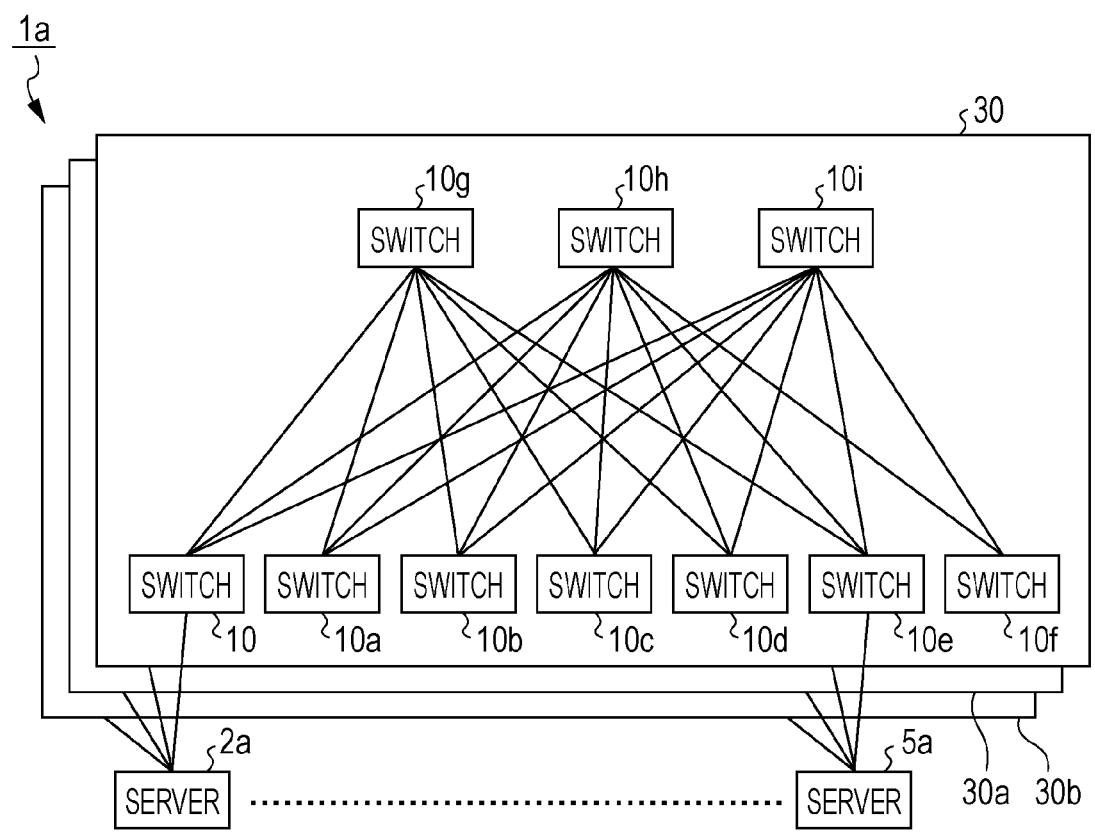
FIG. 9 is a diagram illustrating an example of an information processing system, according to a second embodiment.

FIG. 9 is a diagram illustrating an example of an information processing system, according to a second embodiment. FIG. 9 illustrates an example of a system having a fat tree in a multi-stage structure. In the example in FIG. 9, the information processing system 1a in the second embodiment is structured by connecting a plurality of switches in three tires. For example, the information processing system 1a has servers 2a to 5a that have functions similar to the functions of the servers 2 to 5.

The information processing system 1a has a network 30, in which switches 10 to 10i connected as in the information processing system 1 are included, and also has a plurality of networks 30a and 30b which have functions similar to the functions of the network 30. In the information processing system 1a, the switches that function as edges (leaves) in each of the networks 30, 30a, and 30b are connected to the servers 2a to 5a. For example, the server 2a is connected to a switch that functions as an edge in each of the networks 30, 30a, and 30b.

The information processing system 1a has additional networks having functions similar to the functions of the network 30 as described above, thereby expanding a system scale. For example, since many servers are connected to a network in a data center, a method in which switches each having many ports are used may be considered. However, a switch having many ports is expensive, increasing a cost in system construction.

Meanwhile, when normal switches are connected in a multi-stage structure, a network to which many servers are connectable may be created without increasing cost. When switches are connected in a multi-stage structure, a plurality of paths may be usable for each server to perform transmission of packets. Some of the plurality of paths through which each server is able to perform transmission of packets may have almost the same latency. When switches in the conventional first-arrival learning method are used, however, the order of ports from which a packet is transmitted during flooding is fixed, causing unbalanced use of paths through which each server performs transfer of packets. By contrast, the switches 10 to 10i transmit a packet from ports, during flooding, without fixing the order of ports from which the packet is to be transmitted, suppressing unbalanced use of paths.

(2) Packet Processing Unit

In the packet processing unit 13 described above, the packet transfer processing unit 21, MAC learning processing unit 22, first-arrival learning processing unit 23, and path distribution processing unit 24 perform processing in cooperation. However, the embodiments are not limited to this, that is, the functions of the packet transfer processing unit 21, MAC learning processing unit 22, first-arrival learning processing unit 23, and path distribution processing unit 24 may be freely combined and separated.

The switch 10 described above transmits, in a non-fixed order, a packet from all ports other than the port via which the packet was received. The embodiments are not limited to this. For example, the switch 10 may select predetermined ports, from ports other than the port via which the packet was received, and may transmit, in a non-fixed order, the packet from ports other than the selected predetermined ports. In this processing, since the predetermined ports connected to non-switch devices such as servers are excluded from ports from which packets are to be flooded, the switch 10 may reduce the amount of traffic on the network.

(3) Network

The information processing system 1 and information processing system is described above each have a fat-tree network. However, the embodiments are not limited to this; the plurality of switches 10 to 10i may be connected in a desired topology. That is, the switch 10 may solve the problem of the unbalanced use of paths through which packets are transferred, regardless of the topology of the network.

(4) Program

The switch 10 in the first and second embodiments has been described for a case in which hardware components are used to perform various types of processing. However, the embodiments are not limited to this. A computer in the switch 10 may execute a program prepared in advance to perform the processing. An example of a computer that executes a program that implements functions similar to the functions of the switch 10 will be described below with reference to FIG. 10.

Figure 10:
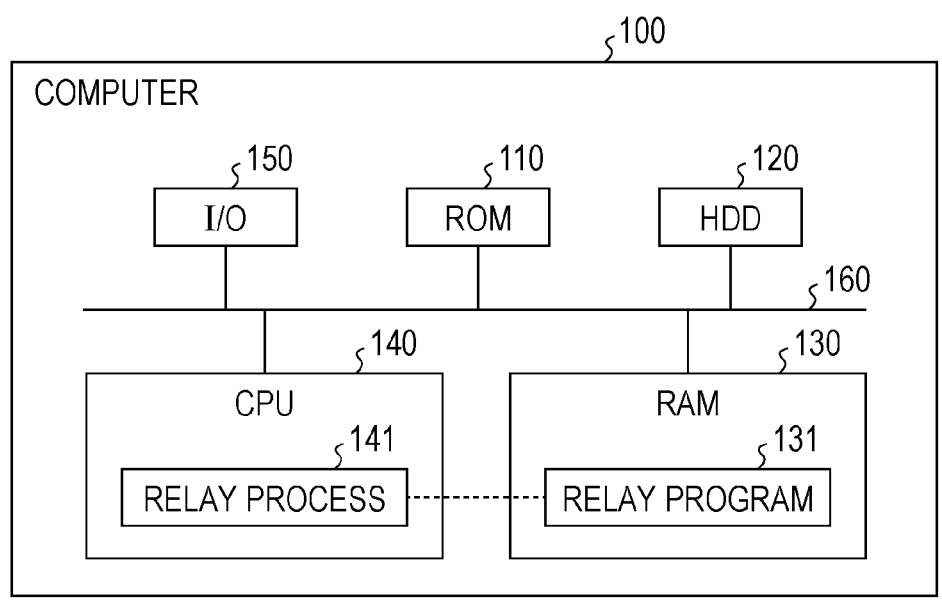
FIG. 10 is a diagram illustrating an example of a computer that executes a relay program, according to an embodiment.

FIG. 10 is a diagram illustrating an example of a computer that executes a relay program, according to an embodiment.

In the computer 100 illustrated in FIG. 10, a read-only memory (ROM) 110, a hard disc drive (HDD) 120, a random-access memory (RAM) 130, a central processing unit (CPU)

140 are mutually connected via a bus 160. The computer 100 in FIG. 10 also has an input/output (I/O) unit 150 used to transmit and receive packets.

A relay program 131 is prestored in the RAM 130. When the CPU 140 reads out the relay program 131 from the RAM 130 and executes the relay program 131, the relay program 131 functions as a relay process 141 in the case of the example in FIG. 10. The relay process 141 implements functions similar to the functions of the connecting unit 11, MAC processing unit 12, and packet processing unit 13 illustrated in FIG. 2. Although not illustrated in FIG. 10, the relay program 131 includes, as data, information similar to the information in the statistical information 25, FDB 26, and first-arrival learning table 27 illustrated in FIG. 2.

The relay program described in the embodiment may be implemented by causing a personal computer, a workstation, or another type of computer to execute a program prepared in advance. This program may be distributed through the Internet or another network. This program is recorded on a hard disc a flexible disc (FD), a compact disc-read-only memory (CD-ROM), a magneto-optical (MO) disc, a digital versatile disc (DVD), or another type of computer-readable recording medium. This program may also be executed by being read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for relaying a packet transmitted from and to an information processor, the apparatus comprising:
a plurality of ports each configured to transmit and receive the packet;
a memory configured to store first identification information identifying the information processor in association with one of the plurality of ports from which the packet is to be transmitted to the information processor; and
a processor configured:
to determine, when a first packet is received via a first port in the plurality of ports, whether second identification information that is contained in the first packet and identifies a transmission destination of the first packet is stored in the memory or not,
to transmit, when it is determined that the second identification information is stored in the memory, the first packet from a second port associated with the second identification information, and
to transmit, when it is determined that the second identification information is not stored in the memory, the first packet from third ports that are sequentially selected, from among the plurality of ports other than the first port, in variable order that is dynamically determined based on a current traffic state of the plurality of ports.

2. The apparatus of claim 1, wherein
upon receiving a second packet via a fourth port in the plurality of ports, the processor registers third identification information identifying the information processor that is a transmission source of the second packet, in association with the fourth port; and
upon receiving, via multiple ports in the plurality of ports, third packets identical to each other, the processor registers fourth identification information identifying the information processor that is a transmission source of the third packets, in association with a fifth port via which the third packet has been received first among the multiple ports.

3. The apparatus of claim 1, wherein
the processor counts a number of packets that have been transmitted from each of the plurality of ports; and
the processor transmit, when it is determined that the second identification information is not stored in the memory, the first packet from the third ports that are sequentially selected, from among the plurality of ports other than the first port, in ascending order of the number of packets that have been transmitted from each of the third ports.

4. The apparatus of claim 1, wherein
when it is determined that the second identification information is not stored in the memory, the processor transmits the first packet from the third ports that are sequentially selected, from among the plurality of ports other than the first port, in ascending order of a number of pieces of the first identification information that have been registered in association with each of the third ports.

5. The apparatus of claim 1, wherein
the memory includes a plurality of buffers each temporarily storing, for each of the plurality of ports, packets to be transmitted from the each port;
the processor counts a number of detections of a congested state in which the number of packets temporarily stored in the each buffer exceeds a predetermined threshold value; and
the processor transmit, when it is determined that the second identification information is not stored in the memory, the first packet from the third ports that are sequentially selected, from among the plurality of ports other than the first port, in ascending order of the number of detections of the congested state.

6. The apparatus of claim 1, wherein
the processor counts, at predetermined intervals, an increased number of packets that have been transmitted from each of the plurality of ports; and
the processor transmit, when it is determined that the second identification information is not stored in the memory, the first packet from the third ports that are sequentially selected, from among the plurality of ports other than the first port, in ascending order of the increased number of packets that have been transmitted from the each of the third ports.

7. The apparatus of claim 1, wherein
upon receiving, via multiple ports in the plurality of ports, second packets identical to each other, the processor discards the second packets that have been received via ports other than a fourth port via which the second packet has been received first among the multiple ports;
the processor counts a number of packets that have been discarded; and
the processor transmit, when it is determined that the second identification information is not stored in the memory, the first packet from the third ports that are sequentially selected, from among the plurality of ports other than the first port, in ascending order of the number of packets that have been discarded.

8. A system comprising:
a plurality of servers each configured to transmit and receive a packet; and
a plurality of switches that are connected with each other and relay packets transferred among the plurality of servers, wherein
each of the plurality of switches includes:
  a plurality of ports each configured to transmit and receive the packet;
  a memory configured to store first identification information identifying the information processor in association with a port from which the packet is to be transmitted to the information processor; and
  a processor configured:
    to determine, when a first packet is received via a first port in the plurality of ports, whether second identification information that is contained in the first packet and identifies a transmission destination of the first packet is stored in the memory or not,
    to transmit, when it is determined that the second identification information is stored in the memory, the first packet from a second port associated with the second identification information, and
    to transmit, when it is determined that the second identification information is not stored in the memory, the first packet from third ports that are sequentially selected, from among the plurality of ports other than the first port, in variable order that is dynamically determined based on a current traffic state of the plurality of ports.

9. A method for relaying a packet transmitted from and to an information processor, the method being performed by a switch provided with a plurality of ports, the method comprising:
storing first identification information identifying the information processor in association with one of the plurality of ports from which the packet is to be transmitted to the information processor;
determining, when a first packet is received via a first port in the plurality of ports, whether second identification information that is contained in the first packet and identifies a transmission destination of the first packet is stored in the memory or not;
transmitting, when it is determined that the second identification information is stored in the memory, the first packet from a second port associated with the second identification information; and
transmitting, when it is determined that the second identification information is not stored in the memory, the first packet from third ports that are sequentially selected, from among the plurality of ports other than the first port, in variable order that is dynamically determined based on a current traffic state of the plurality of ports.

10. A non-transitory computer readable recording medium having stored therein a program for causing a computer included in a switch to execute a procedure, the switch being provided with a plurality of ports and relaying a packet transmitted from and to an information processor, the procedure comprising:
storing first identification information identifying the information processor in association with one of the plurality port from which the packet is to be transmitted to the information processor;
determining, when a first packet is received via a first port in the plurality of ports, whether second identification information that is contained in the first packet and identifies a transmission destination of the first packet is stored in the memory or not;
transmitting, when it is determined that the second identification information is stored in the memory, the first packet from a second port associated with the second identification information; and
transmitting, when it is determined that the second identification information is not stored in the memory, the first packet from third ports that are sequentially selected, from among the plurality of ports other than the first port, in variable order that is dynamically determined based on a current traffic state of the plurality of ports.

* * * * *